July 16, 1963
G. J. FULCHER
3,097,755
BOAT TRAILER
Filed Jan. 17, 1961
3 Sheets-Sheet 1
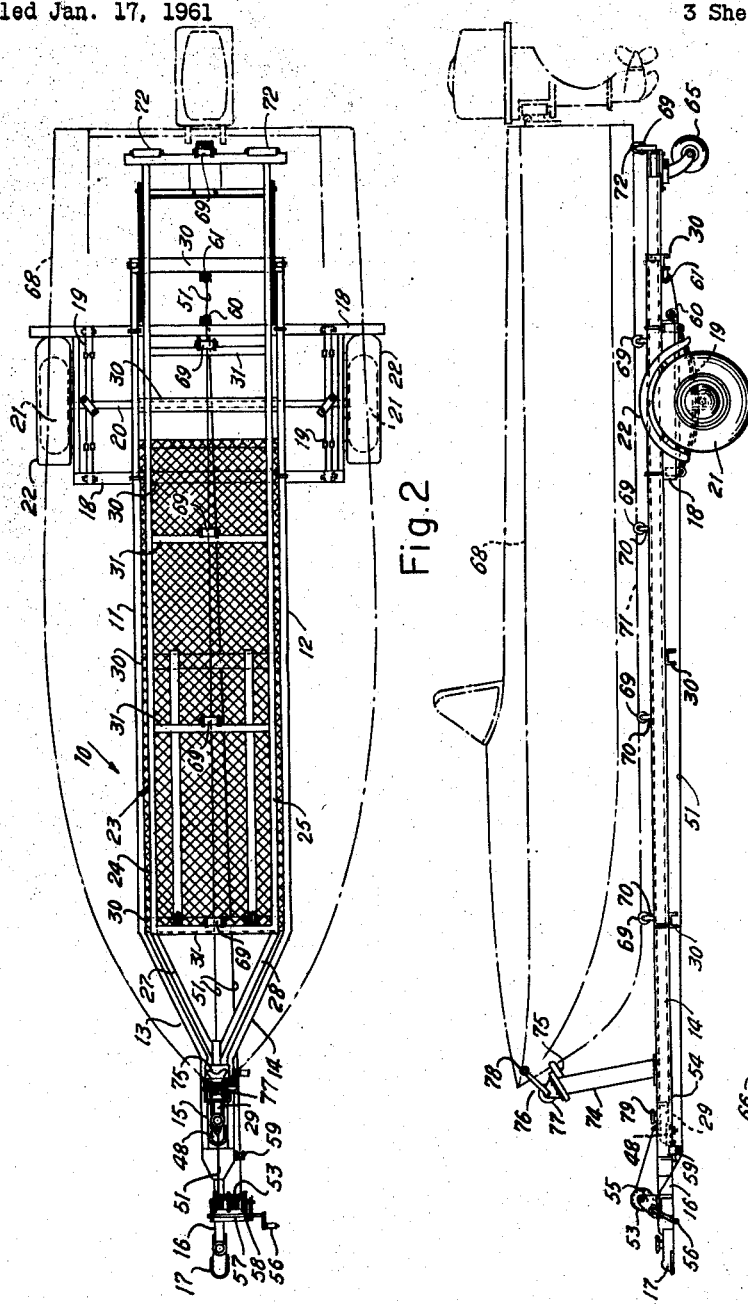
INVENTOR
Garland J. Fulcher
BY Cecil L. Wood
ATTORNEY July 16, 1963
G. J. FULCHER
3,097,755
BOAT TRAILER
Filed Jan. 17, 1961
3 Sheets-Sheet 2
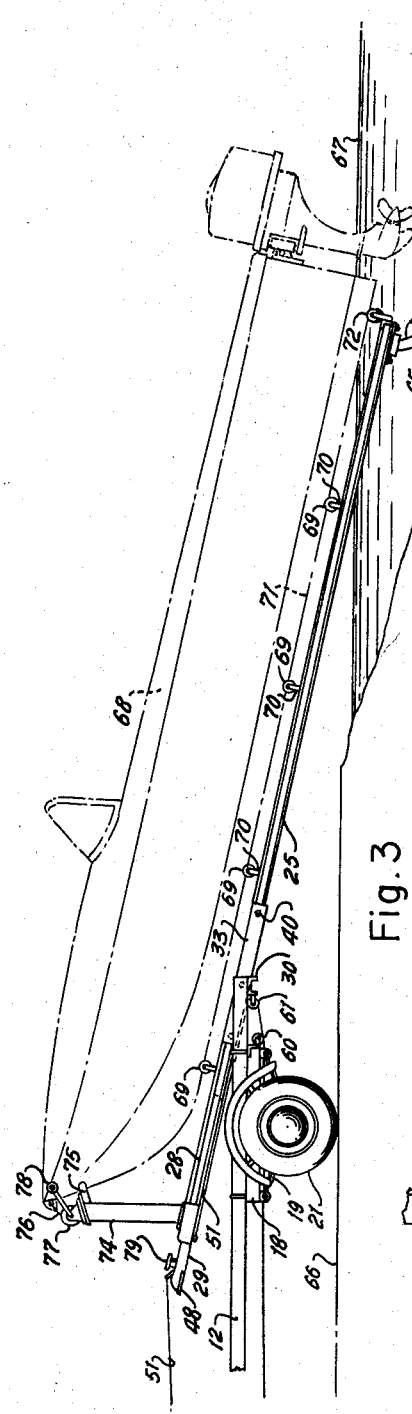
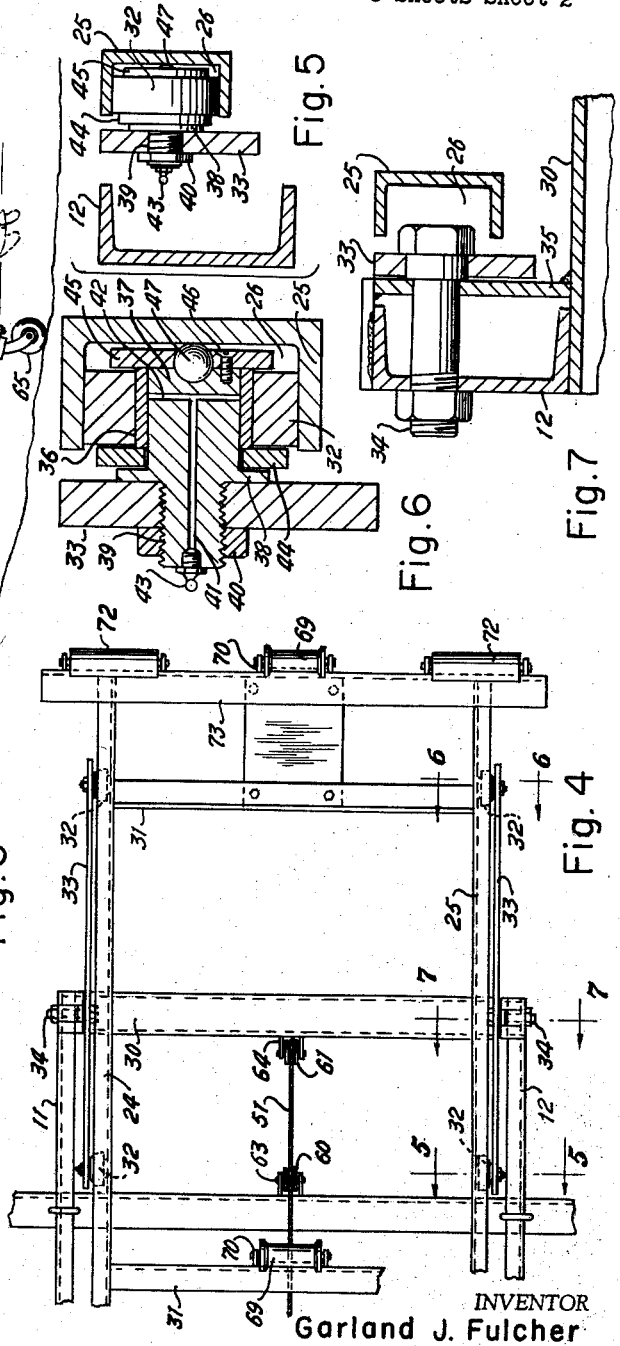
INVENTOR
Garland J. Fulcher
BY
ATTORNEY July 16, 1963
G. J. FULCHER
3,097,755
BOAT TRAILER
Filed Jan. 17, 1961
3 Sheets-Sheet 3
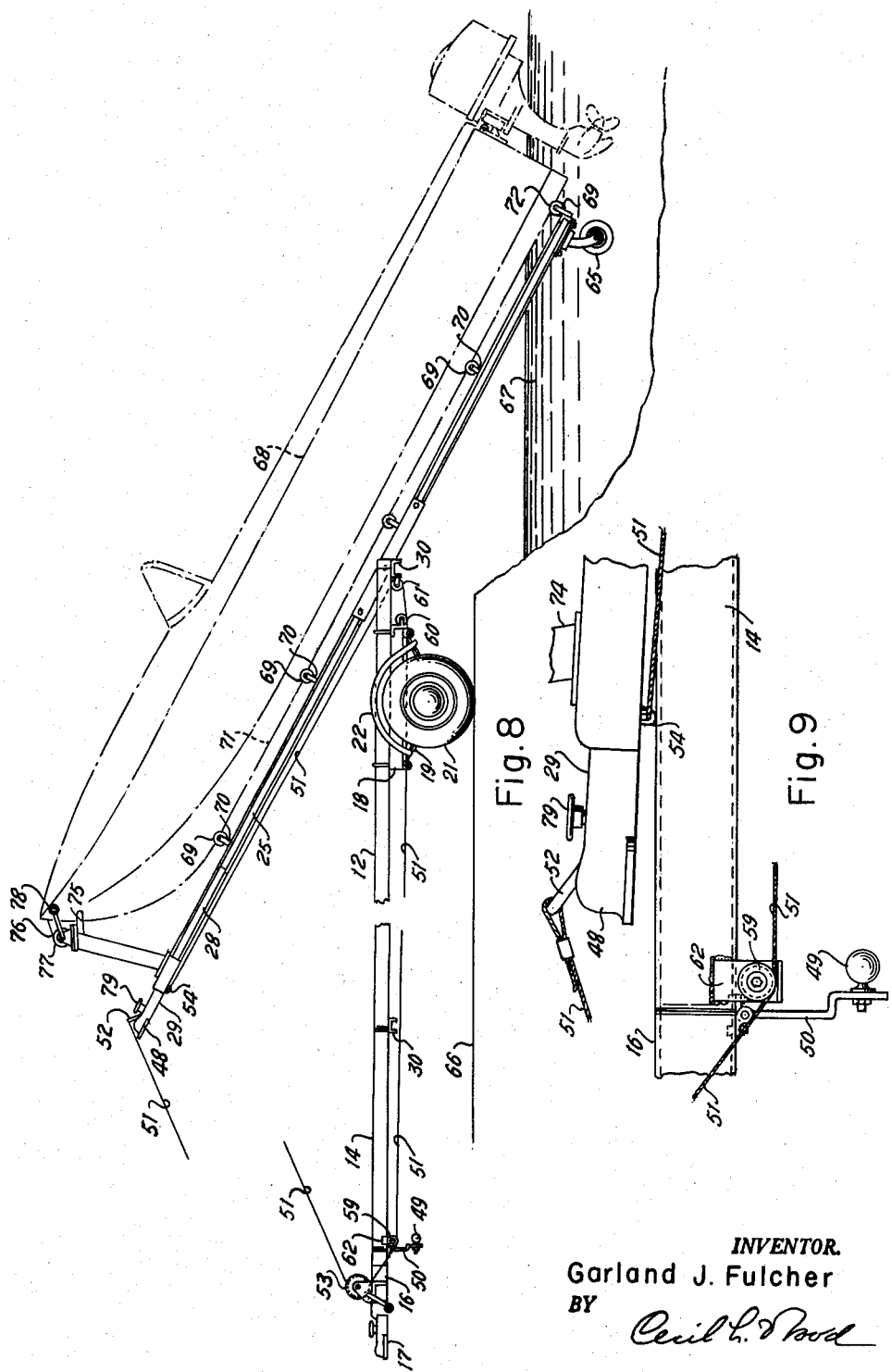
INVENTOR.
Garland J. Fulcher
BY
ATTORNEY

United States Patent Office 3,097,755
Patented July 16, 1963

3,097,755
BOAT TRAILER
Garland J. Fulcher, 907 Main St., Gatesville, Tex.
Filed Jan. 17, 1961, Ser. No. 83,235
4 Claims. (Cl. 214—505)

This invention relates to boat trailers adapted to be towed by an automobile for transporting boats, and it has particular reference to a light trailer having an extensible section by which a boat can be launched while the trailer is coupled to the towing vehicle, and the principal object of the invention resides in the provision of a trailer structure having a subframe adapted to slide longitudinally of the main frame and support a boat thereon whereby the latter can be inclined rearwardly of the trailer, the subframe providing a launching way for the boat at the water's edge.

Another object of the invention is that of providing a boat trailer in which is embodied a novel cable arrangement by which the subframe can be extended and retracted while carrying the boat from loaded to launching position, and vice versa, with a minimum of effort.

Still another object of the invention resides in the provision of a boat trailer in which both subframe and boat have separate cable means for operating the same to loading and unloading positions, and whereby the subframe, with the boat, can be inclined rearwardly of the trailer, having their pivoting point intermediate their ends at the rearmost end of the trailer frame, and balanced in such manner as to enable the subframe to be extended its full length without undue stress on the coupling between the trailer and the towing vehicle.

Another object of the invention is that of providing a cradle element pivotally attached intermediate its ends at the rearmost end of the trailer frame and adapted to support the subframe for sliding movement longitudinally of the trailer frame thus providing for a maximum inclination of the subframe while minimizing the frictional association between the latter and the trailer frame.

Yet another object of the invention resides in the provision of a caster wheel attached to the rearmost end of the subframe whereby the trailer can be moved about and maneuvered to different positions while the subframe is extended, and whether or not the boat is loaded thereon, thus affording means whereby the boat can be readily launched under the most difficult conditions.

Broadly, the invention contemplates the provision of a boat trailer in which the extensible subframe has an independent carriage pivotally connected to the main frame of the trailer, and whereby the supporting elements for the subframe are spaced substantially from opposite sides of the pivot point of said carriage.

While the foregoing objects are paramount, other and lesser objects will become manifest as the description proceeds, taken in connection with the appended drawings wherein:

FIGURE 1 is a side elevational view of the invention as towed by a vehicle (not shown), and showing a boat thereon in dotted lines.

FIGURE 2 is a plan view of the invention showing the subframe in towing position, and showing the outline of a boat in dotted lines.

FIGURE 3 is a fragmentary side elevational view of the trailer showing the subframe extended and inclined in launching position for the boat shown in dotted lines.

FIGURE 4 is a fragmentary plan view of the rear end of the trailer frame and the subframe in towing positions, and showing the subframe carriage slidably connected thereto.

FIGURE 5 is a cross-sectional view on line 5—5 of FIGURE 4, through one side of the trailer frame and subframe, and the subframe carriage, and showing one of the subframe rollers.

FIGURE 6 is a cross-sectional view, on line 6—6 of FIGURE 4, through one of the subframe rollers and the carriage.

FIGURE 7 is a cross-sectional view on line 7—7 of FIGURE 4 illustrating the pivot for the subframe carriage.

FIGURE 8 is a side elevational view of the trailer showing the subframe in inclined launching position, the boat being shown in dotted lines, and FIGURE 9 is a fragmentary illustration of the main frame and the latching members for the subframe.

The invention primarily comprises a main frame structure 10 which is formed by a pair of parallel spaced channel members 11 and 12 whose forward ends 13 and 14 converge and extend forwardly in relatively close parallel relationship to form a channel 15 whose function will presently become apparent. A hitch pole 16 provides an extension of the members 13 and 14 and has a ball socket 17 secured thereto which complements a hitch ball on the rear of a towing vehicle, neither of which are illustrated. The hitch arrangement is of the conventional type.

The frame 10 is supported near its rear end on an axle frame assembly consisting of a rectangular frame 18 transversely of the frame 10, as shown in FIGURES 2 and 4, a pair of leaf springs 19 being attached at their ends to each parallel side member of the axle frame 18, and being secured intermediate their ends on an axle 20 having wheels 21 on each end. Fenders 22 are provided for the wheels 21 and are attached to the end members of the axle frame 18.

A subframe 23 is supported in the main frame 10 and conforms thereto in shape, having parallel side channel members 24 and 25 which are spaced inwardly from the main frame members 11 and 12, as shown in FIGURES 2, 4, 5 and 7, their channels 26 opposing those of the main frame members 11 and 12. The forward ends 27 and 28 of the subframe members 24 and 25 incline inwardly parallel to the angular portion 13 and 14 of the members 11 and 12, and an extension 29 is attached thereto which is adapted to project into the channel 15 between the members 13 and 14, as shown in FIGURES 1 and 2 in which the subframe 23 is shown locked in the main frame 10 and the trailer is in towing position.

The main frame 10 has a series of transverse channel members 30 which are spaced therealong and connect the parallel members 11 and 12. Transverse members 31 connect the longitudinal parallel side members 24 and 25 of the subframe 23.

Each of the longitudinal channel members 24 and 25 of the subframe 23 are slidably supported by a pair of rollers 32 pivoted to each end of a bar 33 pivoted intermediate its ends to the rearmost end of each of the parallel main frame members 11 and 12, as shown in FIGURES 4 and 7. Each bar 33 is pivotally supported on a bolt 34 arranged through each frame member 11 and 12 and a plate 35, as shown in FIGURE 7.

Each of the rollers 32 is journalled on a bearing 36 which, while illustrated in FIGURE 6 as a friction type bearing, may be of any type of non-friction bearing. The bearings 36 are arranged on trunnions 37 which are formed with annular flanges 38 and threaded spindles 39 which latter are threaded into the bars 33 and secured by nuts 40 on their outer ends, as illustrated in FIGURES 5 and 6. The bearings 36 are lubricated through grease conduits 41 and 42 axially of the spindles 39 and transversely through the trunnion 37, respectively, a conventional grease fitting 43 being threaded into each of the conduits 41 in the ends of the spindles 39.

Each bearing 36 is retained by a washer 44 arranged about its trunnion 37 adjacent the flange 38, as apparent in FIGURES 5 and 6, and a circular plate 45 is secured to the end of the trunnion 37 by one or more screws 46. A steel ball 47 is arranged in an aperture centrally of the plates 45, and projecting therethrough, engages the inner surfaces of the channels 26 of the subframe members 24 and 25 providing a thrust bearing. The subframe 23 is supported entirely by the bars 33 in its longitudinal movement with respect to the main frame 10, as shown in FIGURES 3 and 8, the pivoted bars 33 being capable of a rocking motion as the balance of weight is transferred rearwardly of the frame 10 when the subframe 23 is extended.

Attached to the forward end of the extension 29 of the subframe 23 is a ball socket 48 of conventional design which is engaged by a ball 49 attached to the free end of a latch bar 50 hinged at its opposite end beneath the front end of the main frame 10 and within the channel 15 which receives the extension 29 of the subframe 23 when the sections are joined in towing position, as illustrated in FIGURES 1 and 2.

A cable 51 is attached at one end to an eye 52 on the socket 48 on the subframe 23, as shown in FIGURES 3, 8 and 9, and is coiled about a windlass 53 attached to the extension 16 of the main frame 10, and has its opposite end connected to an eye 54 on the underside of the extension 29 on the subframe 23. The windlass 53 is mounted in a bracket 55 and has a crank 56 which is attached to a jack shaft 57 having a pinion 58 thereon meshed with one flange of the windlass 53 thus compounding the leverage on the crank 56.

Since both ends of the cable 51 are secured to the forward end of the subframe 23, and has several turns about the windlass 53 it is, for the purpose, endless. By turning the windlass 53 in one direction the subframe 23 is moved rearwardly of the main frame 10, and when turned in the opposite direction the subframe 23 is moved forwardly and into towing position.

Intermediate its secured ends the cable 51 operates over a series of pulleys 59, 60 and 61, the former being pivoted to a bracket 62 depending from the forward end of the frame 10, as shown best in FIGURE 9, and the pulleys 60 and 61 are mounted in brackets 63 and 64, respectively, on the transverse frame members 18 and 30, as illustrated in FIGURES 1, 2, 3, 4 and 8. The subframe 23 is extended rearwardly of the main frame 10 by the cable 51 until the balance of weight is rearward of the pivots 34 of the bars 33, as occurs in the position shown in FIGURE 8, when the caster wheel 65 engages the ground 66.

In this position the assembly can be maneuvered to various positions, and inclined to a substantial angle with respect to the ground level, as over a relatively steep bank into the water 67, so that a boat 68 thereon can be launched quite easily under conditions not ordinarily considered favorable. The caster wheel 65 is of the swivel type so that the trailer can be turned and moved about even while the subframe 23, with the boat 68 mounted thereon, is extended and in an inclined position.

The subframe 23 has a series of spool-type rollers 69 rotatably supported in bracket 70 on the transverse members 31 of the subframe 23 on which the keel 71 of the boat 68 rests when in transit, and expedite loading and unloading the same. The opposingly inclined sides of the bottom of the boat 68, at the stern thereof, are supported on oppositely inclined rollers 72 axially mounted transversely of the subframe 23 on the rearmost transverse member 73 thereof, which also has a roller 69 intermediate its ends, as illustrated in FIGURE 2.

A stanchion 74 is arranged on the forward end of the subframe 23, having an abutment element 75 adjacent its upper end conforming to the bow of the boat 68, providing a stabilizer for the latter when loaded and in transit, as shown in FIGURES 1 and 2. A cable 76 is attached at one end to the bow of the boat 68 and reeled on a windlass 77 at the top of the stanchion 74 by which the boat 68 is loaded on the subframe 23, a crank 78 being provided for the windlass 77.

It is desirable to draw the boat 68, by its cable 76, upon the subframe 23 while the latter is extended, and the caster wheel 65 is still on the ground 66. The subframe 23 may then be drawn forward by its cable 51 whereupon, when the balance of weight is forwardly of the pivots 34 of the bars 33, the boat and subframe will assume a horizontal position and may be drawn forwardly until the socket 48 is aligned with the ball 49 when the latter can be hinged upwardly into the socket 48 and locked by the hand screw 79. This arrangement is shown more in detail in FIGURE 9.

The invention, although described with great particularity, is capable of considerable modification, by persons skilled in the art, without departing from the spirit and intent thereof, or the scope of the appended claims.

What is claimed is:

1. In a boat trailer having a wheeled main frame, and a launching and loading frame, having spaced parallel channelled side members, slidably arranged within said main frame, a carriage for said launching and loading frame comprising, a bar on each side of said launching and loading frame pivoted intermediate its ends to each side of said main frame at the rearmost end thereof, a roller on each end of each of said bars engaging the channelled side members of said launching and loading frame and adapted to slidably and pivotally support the same longitudinally of said main frame, means on said launching and loading frame for supporting a boat, and cable means for operating said launching and loading frame whereby to launch or load said boat.

2. In a boat trailer having a wheeled main frame and a subframe having outwardly facing channelled side members supported in said main frame and adapted to slide longitudinally thereof, a pivotal carriage for said subframe comprising, a pair of arms on the rearmost end of said main frame and pivoted thereto intermediate their ends, a roller on each end of each of said arms for engaging the said channelled members and supporting said subframe whereby the latter is capable of being moved longitudinally with respect to said main frame and inclined rearwardly thereof when extended, a ball arranged concentrically of each of said rollers providing a thrust bearing engaging said channelled members, and cable means for extending and retracting said subframe.

3. In a boat trailer having a main frame and a subframe having outwardly facing channelled side members supported in and coextensive with said main frame and slidable longitudinally thereof, a carriage for said subframe comprising, a pair of arms pivoted intermediate their ends to the rearmost end of said main frame and on each side of said subframe, a roller pivotally secured to each end of each of said arms, each pair of said rollers engaging said channelled members and slidably supporting one side of said subframe, whereby said subframe is adapted to be extended and retracted longitudinally of said main frame, and tilted to inclined position rearwardly thereof, and a cable for operating said subframe to extended and retracted positions on said main frame.

4. In a boat trailer having a wheeled main frame having a pair of parallel side members, and a subframe having channelled side members supported on said wheeled frame between the side members thereof, a carriage for said subframe comprising a pair of bars arranged parallel to said side members of said wheeled frame and pivoted thereto intermediate their ends at the rear of said wheeled frame, a roller pivoted to each end of each of said bars and slidably supporting said subframe on said main frame whereby said subframe is adapted to be tilted to different inclined positions, and cable means on said main frame for operating said subframe to extended and retracted positions.

References Cited in the file of this patent

UNITED STATES PATENTS

| | | |
|---|---|---|
| 1,885,399 | Wren | Nov. 1, 1932 |
| 2,821,315 | Bucher | Jan. 28, 1958 |
| 2,830,717 | Posey | Apr. 15, 1958 |